(12) United States Patent
Neil Ganey et al.

(10) Patent No.: US 9,354,795 B2
(45) Date of Patent: May 31, 2016

(54) REFINING MANUAL INPUT INTERPRETATION ON TOUCH SURFACES

(75) Inventors: Harriss Christopher Neil Ganey, Cary, NC (US); Masaki Matsubara, Kanagawa (JP); Hidetoshi Mori, Kanagawa (JP); Aaron Michael Stewart, Raleigh, NC (US)

(73) Assignee: Lenovo (Singapore) Pte. Ltd, Singapore (SG)

( * ) Notice: Subject to any disclaimer, the term of this patent is extended or adjusted under 35 U.S.C. 154(b) by 2163 days.

(21) Appl. No.: 12/431,920

(22) Filed: Apr. 29, 2009

(65) Prior Publication Data

US 2010/0277419 A1    Nov. 4, 2010

(51) Int. Cl.
G06F 3/041 (2006.01)
G06F 3/0484 (2013.01)
G06F 3/0481 (2013.01)
G06F 3/0488 (2013.01)

(52) U.S. Cl.
CPC .......... *G06F 3/04845* (2013.01); *G06F 3/0481* (2013.01); *G06F 3/04883* (2013.01); *G06F 2203/04806* (2013.01)

(58) Field of Classification Search
CPC .............. G06F 3/0481; G06F 3/04845; G06F 3/04883; G06F 2203/04806
USPC ................... 345/172–178; 178/18.01–18.04; 715/700
See application file for complete search history.

(56) References Cited

U.S. PATENT DOCUMENTS

| 7,607,983 | B2 * | 10/2009 | Nakajima et al. | 463/40 |
| 2003/0184525 | A1 * | 10/2003 | Tsai | 345/173 |
| 2008/0034289 | A1 * | 2/2008 | Doepke et al. | 715/700 |
| 2008/0204476 | A1 * | 8/2008 | Montague | 345/661 |
| 2009/0175200 | A1 * | 7/2009 | Abe | 370/254 |

* cited by examiner

*Primary Examiner* — Amare Mengistu
*Assistant Examiner* — Stacy Khoo
(74) *Attorney, Agent, or Firm* — John L. Rogitz; John M. Rogitz

(57) ABSTRACT

A computer system displays an object on a touch surface and detects multiple touch points on the touch surface in proximity to the displayed object. Next, the computer system detects one or more touch point movements originating from one or more of the plurality of touch points and determines a type of sector in which each of the touch point movements enters. In turn, when one of the touch point movements enters a rotate sector, the computer system performs a rotate command on the object.

14 Claims, 9 Drawing Sheets

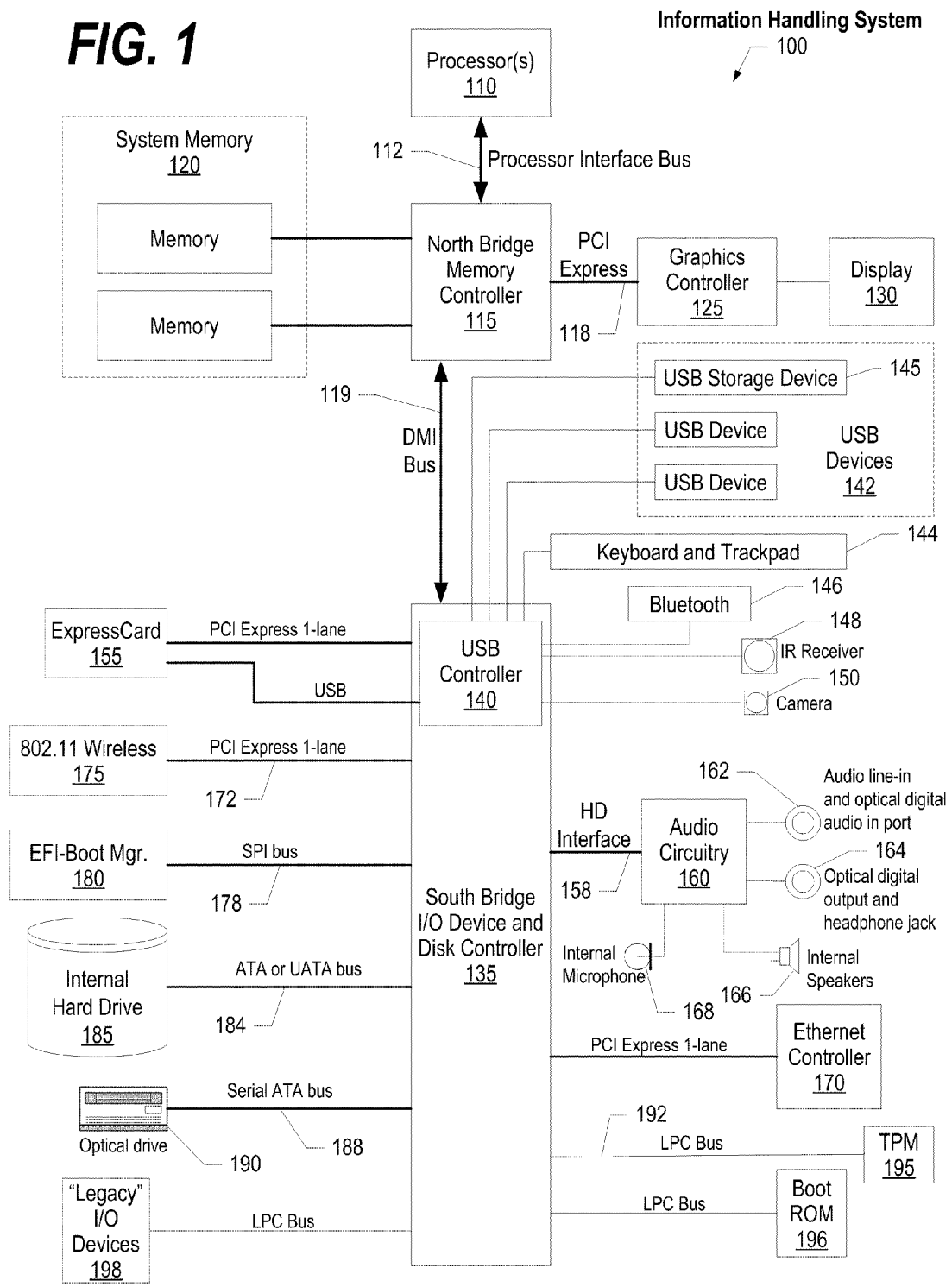

REFINING MANUAL INPUT INTERPRETATION ON TOUCH SURFACES

BACKGROUND OF THE INVENTION

1. Technical Field

The present invention relates to refining manual input interpretation on touch surfaces. More particularly, the present invention relates to simplifying zoom gesture interpretations and rotate gesture interpretations that a user performs on a touch surface.

2. Description of the Related Art

Multi-touch interfaces allow computer users to control graphical applications with two or more fingers. Multi-touch interfaces include a touch surface (display screen, table, wall, etc.) that recognize multiple simultaneous touch points. This is in contrast to older touch screens that recognize only a single touch point. In order to detect multiple touch points, multi-touch interfaces may use means such as resistance, capacitance, heat, finger pressure, high capture rate cameras, infrared light, optic capture, tuned electromagnetic induction, ultrasonic receivers, transducer microphones, laser rangefinders, or shadow capture.

Multi-touch interfaces enable specific gestures to be interpreted as particular commands, such as zoom commands and rotate commands. For example, in the case of a rotate command, the user must have either one finger stationary and move the other finger in an arcing motion, or move both fingers in an arcing motion. In the case of a zoom command, the user must perform an inward or outward "pinch" to zoom in or zoom out. These gestures are not easily reproduced without concentrated effort by the user and require gross and fine motor skills that may be challenging for some users, especially those with special needs. In addition, multi-touch rotate and zoom gesture definitions may cause corresponding detection algorithms to misinterpret a user's intended action. For example, a user may perform a quick rotate gesture that the detection algorithms may interpret as a pinch, thereby performing a zoom command on an object instead of a rotate command.

SUMMARY

A computer system displays an object on a touch surface and detects multiple touch points on the touch surface in proximity to the displayed object. Next, the computer system detects one or more touch point movements originating from one or more of the plurality of touch points and determines a type of sector in which each of the touch point movements enters. In turn, when one of the touch point movements enters a rotate sector, the computer system performs a rotate command on the object.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 1 is a block diagram of a data processing system in which the methods described herein can be implemented;

DETAILED DESCRIPTION

Figure 2A:
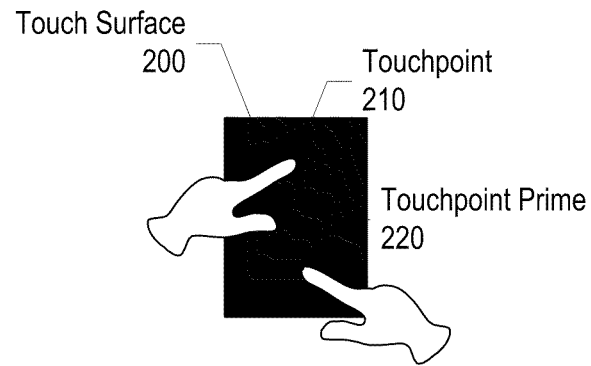
FIG. 2A is a diagram showing a user contacting a touch surface at two touch points.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, et cetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems.

FIG. 2A is a diagram showing a user contacting a touch surface at two "touch points." Touch surface 200 (e.g., computer monitor, personal digital assistant display, etc.) couples to an electronic device and detects areas in which a user contacts, such as for selecting a picture or document that is displayed on touch surface 200.

FIG. 2A shows that the user contacts touch surface 200 at two touch points, which are touch point 210 and touch point prime 220. The invention described herein discloses a computer system establishing zoom sectors and rotate sectors around touch points 210 and 220. In turn, the computer system monitors touch point movements (e.g., finger movements) and performs a zoom command or a rotate command on an object based upon the sector at which the touch point enters (see FIG. 2B-6B and corresponding text for further details).

Figure 2B:
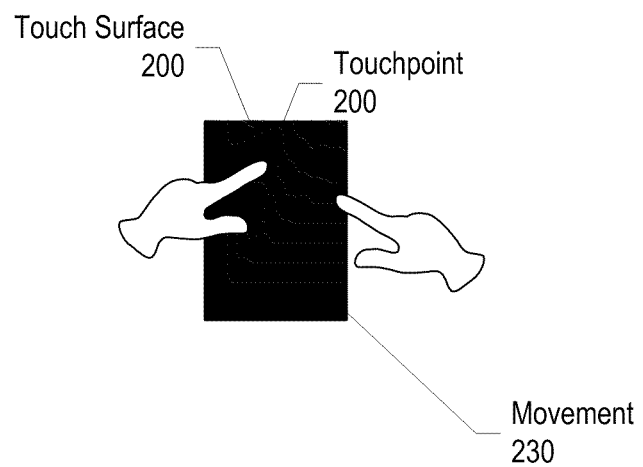
FIG. 2B is a diagram showing a user moving the user's finger on a touch surface that a computer system detects as a touch point movement.

FIG. 2B is a diagram showing a user moving the user's finger on a touch surface that a computer system detects as a touch point movement. After the user touches touch surface 200, the user moves one of the user's fingers and creates touch point movement 230. The computer system analyzes the movement and determines whether the movement entered a zoom sector or rotate sector. In turn, the computer system performs either a zoom command or rotate command, respectively (see FIG. 3A, 3B, and corresponding text for further details). In one embodiment, the user may change the size of the rotate sectors relative to the zoom sectors (see FIG. 7A and corresponding text for further details). In another embodiment, the user may insert dead zones between the zoom sectors and rotate sectors as buffer zones (see FIG. 7B and corresponding text for further details).

Figures 3A, 3B:
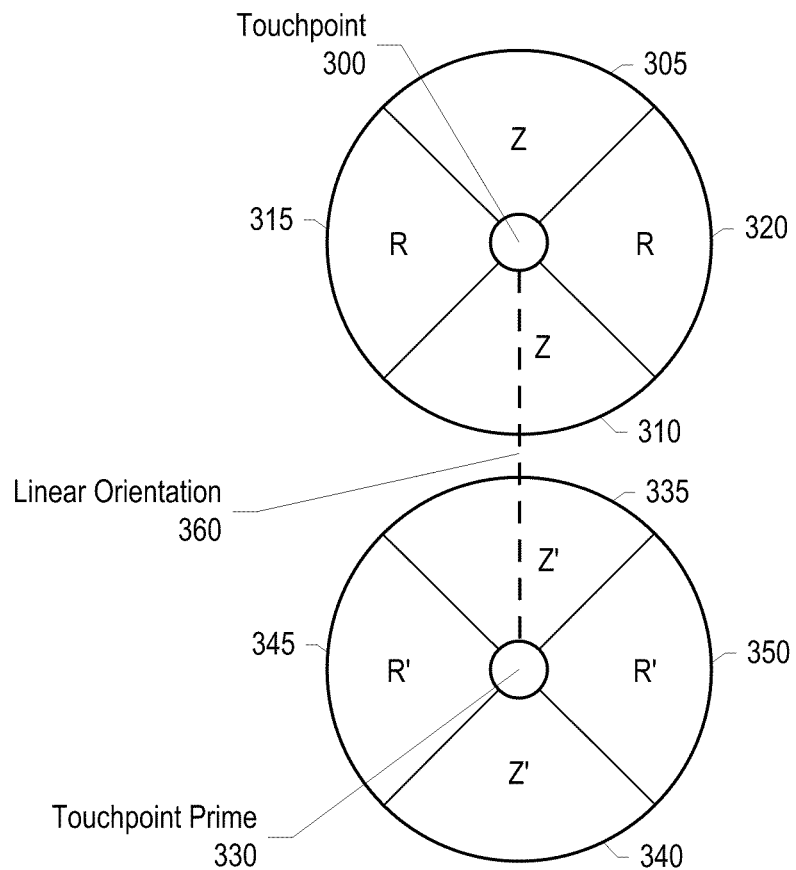
FIG. 3A is a diagram showing two touch points and their corresponding zoom sectors and rotate sectors in which a computer system monitors in order to determine whether to perform a zoom command or a rotate command based upon a user's touch point movement.
FIG. 3B is a table showing actions in which to perform on an object when a computer system detects touch point movements into various zoom sectors and rotate sectors.

FIG. 3A is a diagram showing two touch points and their corresponding zoom sectors and rotate sectors in which a computer system monitors in order to determine whether to perform a zoom command or a rotate command based upon a user's touch point movement.

FIG. 3A shows two touch points, which are touch point 300 and touch point prime 330. When touch points are detected, a computer system defines a "linear orientation" as a line between the two touch points (linear orientation 360). In turn, the computer system uses linear orientation 330 to align zoom sectors and rotate sectors around the touch points accordingly. Zoom sectors are established in line with linear orientation 360 and rotate sectors are established perpendicular to linear orientation 360. As such, zoom sectors 305 and 310 are established around touch point 300 and zoom sectors 335 and 340 are established around touch point prime 330. In turn, rotate sectors 315 and 320 are established around touch point 300 and rotate sectors 345 and 350 are established around touch point prime 330. Note that the locations of zoom sectors and rotate sectors around touch points depend upon the linear orientation of the touch points and adjusts when the linear orientation changes (see FIGS. 4A-B and corresponding text for further details).

Once the zoom sectors and rotate sectors are established, the computer system monitors touch point movement into one or more of the sectors in order to determine whether to perform a zoom command on an object or perform a rotate command on the object. In one embodiment, a user may configure the size of the rotate sectors, which also changes the size of the zoom sectors (see FIG. 7A and corresponding text for further details). In another embodiment, a user may insert "dead zones" between the zoom sectors and rotate sectors to act as buffers between the sectors (see FIG. 7B and corresponding text for further details).

FIG. 3B is a table showing actions in which to perform on an object when a computer system detects touch point movements into various zoom sectors and rotate sectors. As discussed in FIG. 3A above, the alignment of zoom sectors and rotate sectors around touch points depend upon the linear orientation of the touch points.

Table 365 includes touch point movement combinations in column 367 and corresponding actions to perform on an object in column 369. Row 370 shows that when the computer system detects a touch point movement from touch point 300 into either zoom sector 305 or 310 and also detects a touch point movement from touch point 330 into either zoom sector 335 or 340, the computer system performs a zoom command. For example, if a user's finger moves from touch point 300 into zoom sector 310 and the user's other finger moves from touch point prime 330 into zoom sector 335, the computer system performs a zoom out command (making an object smaller).

Row 375 shows that when the computer system detects a touch point movement from touch point 300 into either zoom sector 305 or 310 and also detects a touch point movement from touch point 330 into either rotate sector 345 or 350, the computer system performs a rotate command. Note that since one of the touch point movements enters a rotate sector, the computer system performs a rotate command, regardless of the fact that one of the user's fingers also enters a zoom sector.

Row 380 shows that when the computer system detects a touch point movement from touch point 300 into either rotate sector 315 or 320 and also detects a touch point movement from touch point 330 into either zoom sector 335 or 340, the computer system performs a rotate command. Row 385 shows that when the computer system detects a touch point movement from touch point 300 into either rotate sector 315 or 320 and also detects a touch point movement from touch point 330 into either rotate sector 345 or 350, the computer system performs a rotate command.

Rows 390 and 395 show a computer system's actions when the computer system detects only one touch point movement, such as when one of the user's fingers remains stationary and the other finger moves on the touch surface. Row 390 shows that when the computer system detects a touch point movement from touch point 300 into either zoom sector 305 or 310, or detects a touch point movement from touch point 330 into either zoom sector 335 or 340, the computer system performs a zoom command. And, row 395 shows that when the computer system detects a touch point movement from touch point 300 into either rotate sector 315 or 320, or detects a touch point movement from touch point 330 into either rotate sector 345 or 350, the computer system performs a rotate command.

Figure 8:
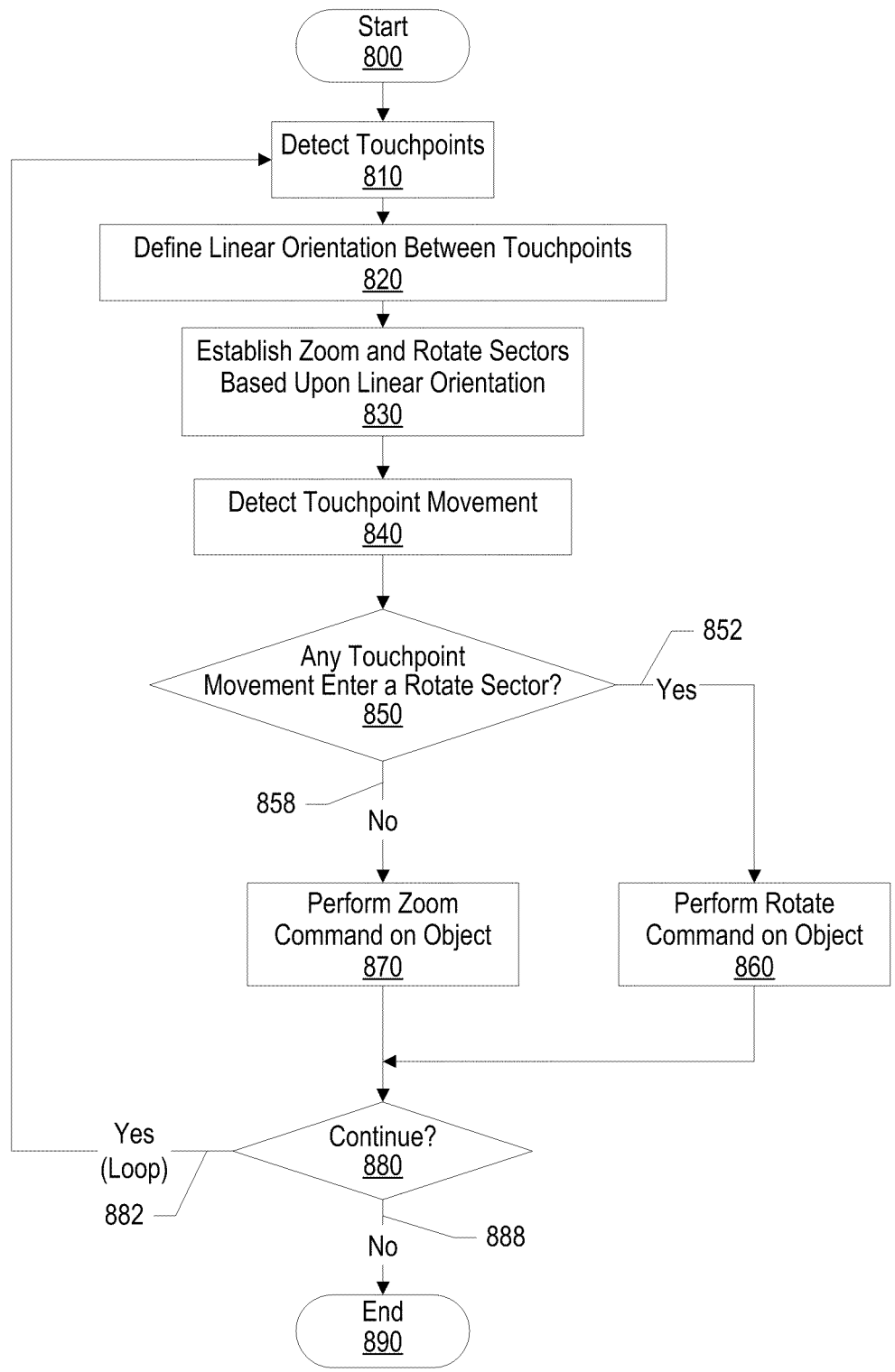
FIG. 8 is a flowchart showing steps taken in monitoring a touch surface and performing actions according to touch point movements.

In summary, as can be seen from the above discussion, whenever the computer system detects a touch point movement into a rotate sector, the computer system performs a rotate command (see FIG. 8 and corresponding text for further details). In one embodiment, a user may specify the rate at which to zoom in/out or rotate an object (see FIG. 9 and corresponding text for further details).

Figure 4A:
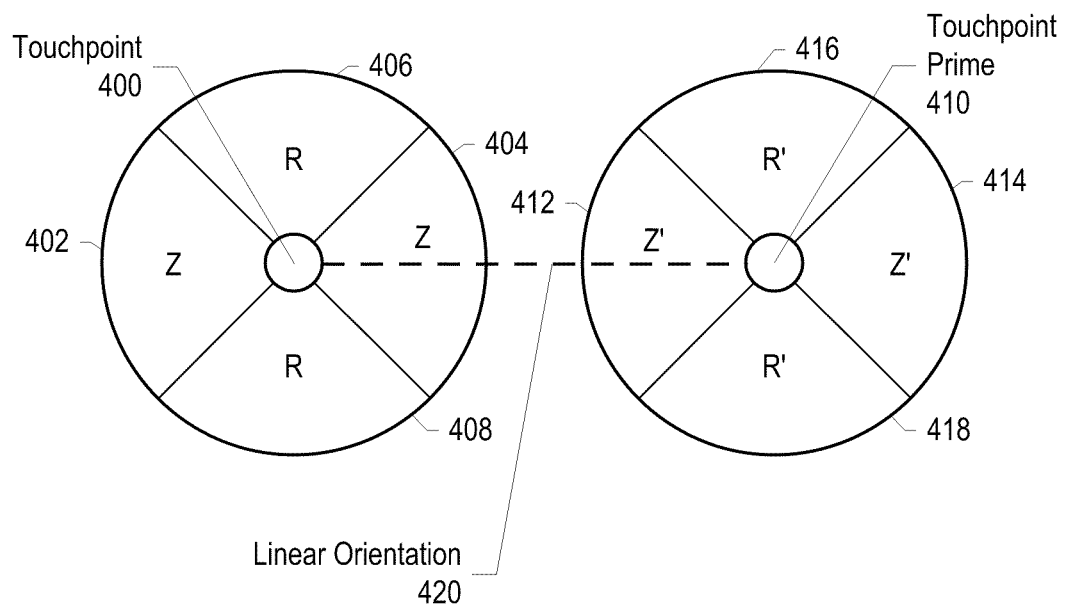
FIG. 4A is a diagram of two touch points that are oriented in a horizontal direction.

FIG. 4A is a diagram of two touch points that are oriented in a horizontal direction. When a computer system detects touch points 400 and 410, the computer system defines linear orientation 420 between the touch points. In turn, the computer system establishes zoom sectors in line with linear orientation 420, which are sectors 402, 404, 412, and 414. The computer system also establishes rotate sectors perpendicular to linear orientation 420, which are sectors 406, 408, 416, and 418. The computer system then utilizes the table shown in FIG. 3B (or an algorithm) to determine whether to perform a zoom command or a rotate command based upon a user's touch point movements.

Figure 4B:
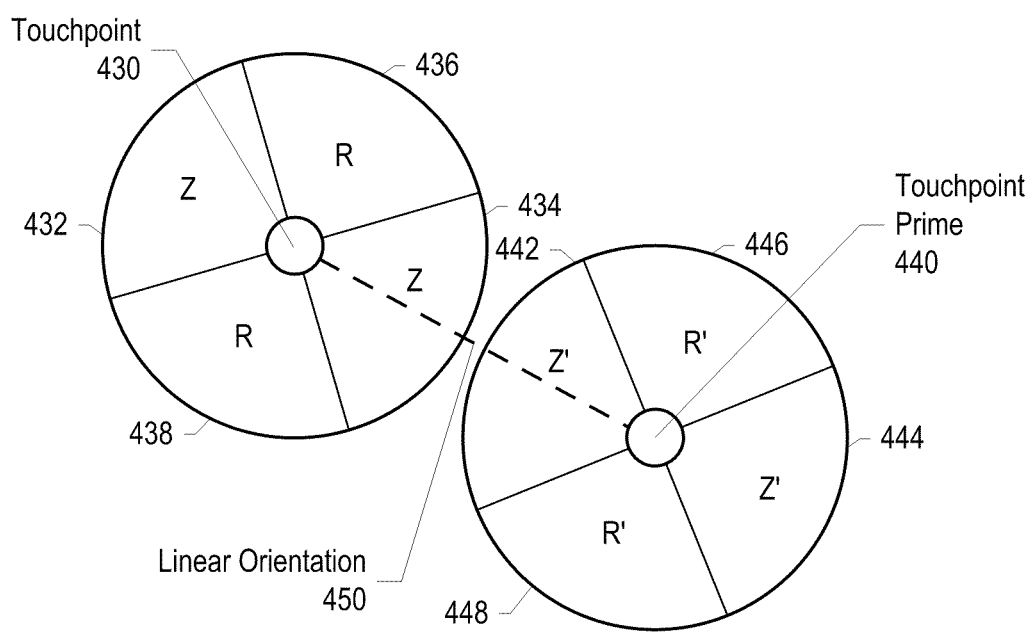
FIG. 4B is a diagram of two touch points that are oriented at an angle from each other.

FIG. 4B is a diagram of two touch points that are oriented at an angle from each other. Again, when a computer system detects touch points 430 and 440, the computer system defines linear orientation 450 between the touch points. In turn, the computer system establishes zoom sectors in line with linear orientation 450, which are sectors 432, 434, 442, and 444. The computer system also establishes rotate sectors perpendicular to linear orientation 450, which are sectors 436, 438, 446, and 448.

Figure 5A:
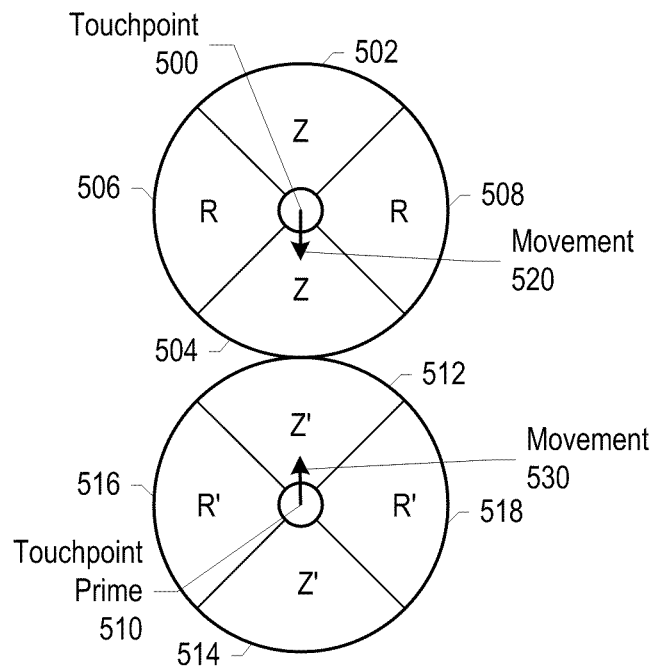
FIG. 5A is a diagram showing touch point movements that invoke a zoom out command.

FIG. 5A is a diagram showing touch point movements that invoke a zoom out command (shrinking an object), such as when a user contacts a touch surface and pinches the user's fingers together.

When a computer system detects touch points 500 and 510 on an object, the computer system defines a linear orientation and establishes zoom sectors 502, 504, 512, and 514, and rotate sectors 506, 508, 516, and 518 as discussed previously. The computer system detects touch point movement 520 into zoom sector 504 and detects touch point movement 530 into zoom sector 512. Since both touch point movements enters zoom sectors, the computer system performs a zoom command on the object.

Figure 5B:
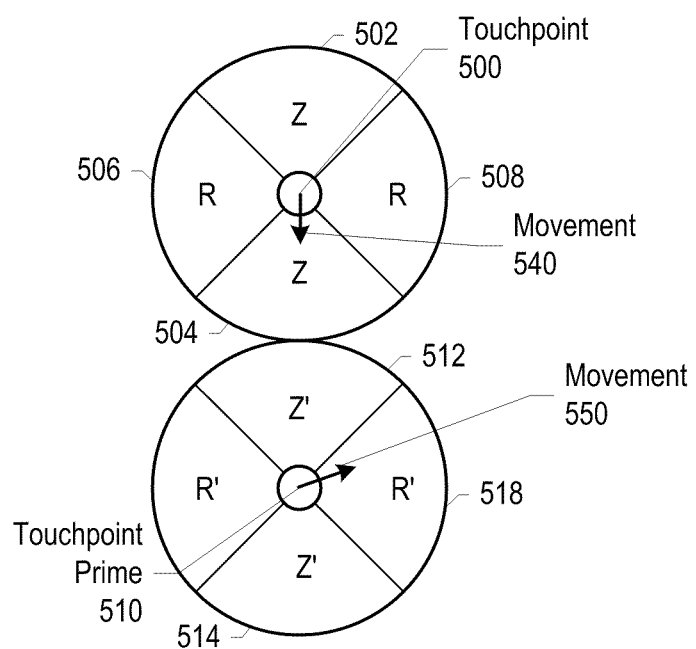
FIG. 5B is a diagram showing an embodiment of touch point movements that invoke a rotate command.

FIG. 5B is a diagram showing an embodiment of touch point movements that invoke a rotate command. As discussed above, when a computer system detects touch points 500 and 510 on an object, the computer system defines a linear orientation and establishes zoom sectors 502, 504, 512, and 514, and rotate sectors 506, 508, 516, and 518 as discussed previously. The computer system then detects touch point movement 540 into zoom sector 504 and detects touch point movement 550 into rotate sector 518. As a result, since one of the touch point movements enters a rotate sector, the computer system performs a rotate command on the object.

Figure 6A:
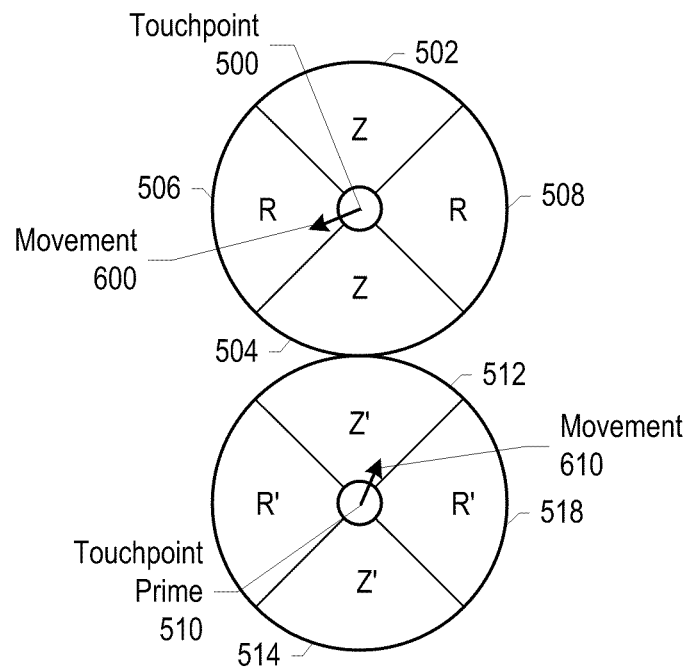
FIG. 6A is a diagram showing another embodiment of touch point movements that invoke a rotate command.

FIG. 6A is a diagram showing another embodiment of touch point movements that invoke a rotate command. The computer system detects touch points 500 and 510, defines a linear orientation between the touch points, and establishes zoom sectors and rotate sectors as discussed in FIG. 5A. The computer system then detects touch point movement 600 into rotate sector 506 and detects touch point movement 610 into zoom sector 512. As a result, since at least one of the touch point movements enters a rotate sector, the computer system performs a rotate command on the object.

Figure 6B:
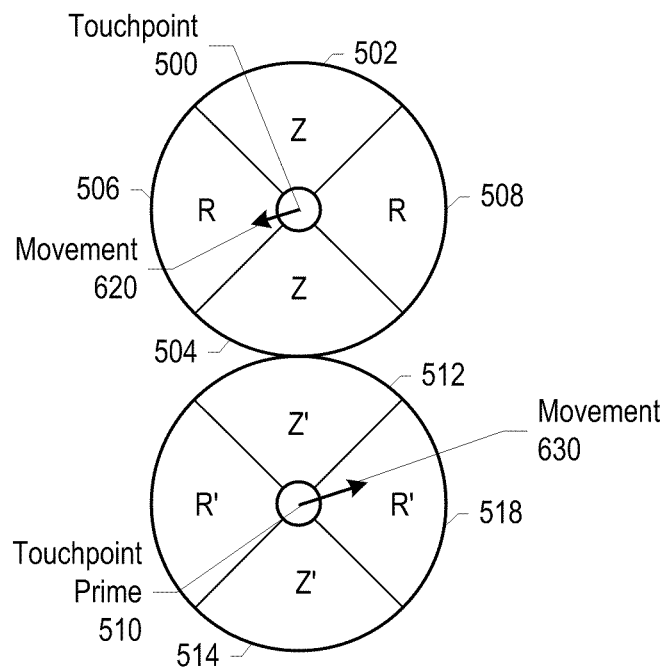
FIG. 6B is a diagram showing yet another embodiment of touch point movements that invoke a rotate command.

FIG. 6B is a diagram showing yet another embodiment of touch point movements that invoke a rotate command. The computer system detects touch points 500 and 510, defines a linear orientation between the touch points, and establishes zoom sectors and rotate sectors as discussed in FIG. 5A. The computer system then detects touch point movement 620 into rotate sector 506 and detects touch point movement 630 into rotate sector 518. Therefore, as discussed above, since at least one of the touch point movements enters a rotate sector, the computer system performs a rotate command on the object.

Figure 7A:
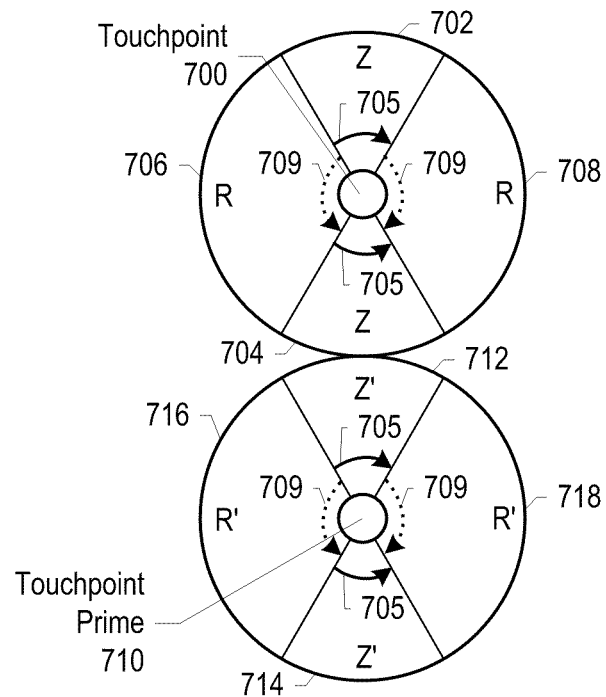
FIG. 7A is a diagram showing rotate sectors that are larger than zoom sectors based upon a user's configuration settings.

FIG. 7A is a diagram showing rotate sectors that are larger than zoom sectors based upon a user's configuration settings. In one default configuration embodiment, each zoom sector and rotate sector encompasses the same amount of area around a touch point. In other words, since four sectors exists around a touch point (two zoom sectors and two rotate sectors), each sector has a "central angle" (opening around the touch point) of 90 degrees (360 degrees/4 sectors). As discussed herein, a "central rotate angle opening" is the central angle of rotate sectors and a "central zoom angle opening" is the central angle of zoom sectors.

In one embodiment, a user may wish to increase the area of the rotate sectors (thus decreasing the area of the zoom sectors). The invention described herein provides a user interface that allows the user to specify a custom central rotate angle opening that is applied to each rotate sector (see FIG. 9 and corresponding text for further details). The example shown in FIG. 7A is an example of a user specified central rotate angle opening that is larger than the default central rotate angle opening (90 degrees) around touch points 700 and 710. As can be seen, central rotate angle opening 709 is larger than central zoom angle opening 705. Thus, each of rotate sectors 706, 708, 716, and 718 is larger than each of zoom sectors 702, 704, 712, and 714.

Figure 7B:
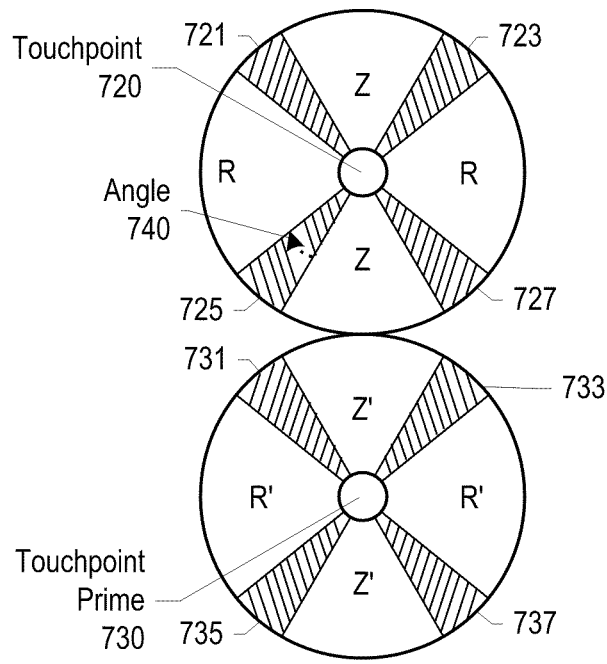
FIG. 7B is a diagram showing user-specified dead zones between zoom sectors and rotate sectors.

FIG. 7B is a diagram showing user-specified dead zones between zoom sectors and rotate sectors. In one embodiment, a user may wish to insert dead zones between zoom sectors and rotate sectors in order to provide a buffer between the sectors. The invention described herein provides a user interface that allows the user to insert dead zones and specify a central dead zone angle opening that is applied to each dead zone (see FIG. 9 and corresponding text for further details).

The example shown in FIG. 7B shows dead zones 721, 723, 725, 727, 731, 733, 735, and 737, which are inserted between zoom sectors and rotate sectors. Each of the dead zones has central dead zone angle opening 740. For the sake of simplicity, only one central dead zone angle opening is shown in FIG. 7B. A user may change the size of each dead zone simply by changing the central dead zone angle opening in the user interface.

FIG. 8 is a flowchart showing steps taken in monitoring a touch surface and performing actions according to touch point movements. A computer system displays objects (e.g., pictures, images, maps, documents, etc.) on a touch surface and monitors the touch surface for a user contacting the touch surface to perform actions on the object, such as zooming in on the object or rotating the object.

Processing commences at 800, whereupon processing detects touch points on the touch surface at step 810. At step 820, processing defines a linear orientation between two touch points, which is an imaginary line between the two touch points, regardless of their horizontal or vertical orientation (see FIGS. 3A, 4A-B, and corresponding text for further details). Next, processing establishes zoom sectors and rotate sectors around the two touch points relative to the linear orientation (step 830). The zoom sectors are equilaterally aligned on the linear orientation around each touch point, and the rotate sectors are equilaterally positioned perpendicular to the linear orientation around each touch point.

Processing, at step 840, detects a touch point movement. The touch point movement may indicate movement from both touch points or movement from one of the touch points. A determination is made as to whether any touch point movement (either one of the movements or both of the movements) enters one of the rotate sectors (decision 850). As can be seen from the table shown in FIG. 3B, whenever a touch point movement enters a rotate sector, the invention described herein performs a rotate command. If the touch point movement entered one of the rotate sectors, decision 850 branches to "Yes" branch 852, whereupon processing performs a rotate command on the object at step 860. On the other hand, if the touch point movement did not enter one of the rotate sectors, decision 850 branches to "No" branch 858, whereupon processing performs a zoom command on the object (step 870).

A determination is made as to whether to continue to monitor the touch surface (decision 880). If processing should continue to monitor the touch surface, decision 880 branches to "Yes" branch 882, which loops back to monitor the touch surface for touch points. This looping continues until processing should terminate, at which point decision 880 branches to "No" branch 888 whereupon processing ends at 890.

Figure 9:
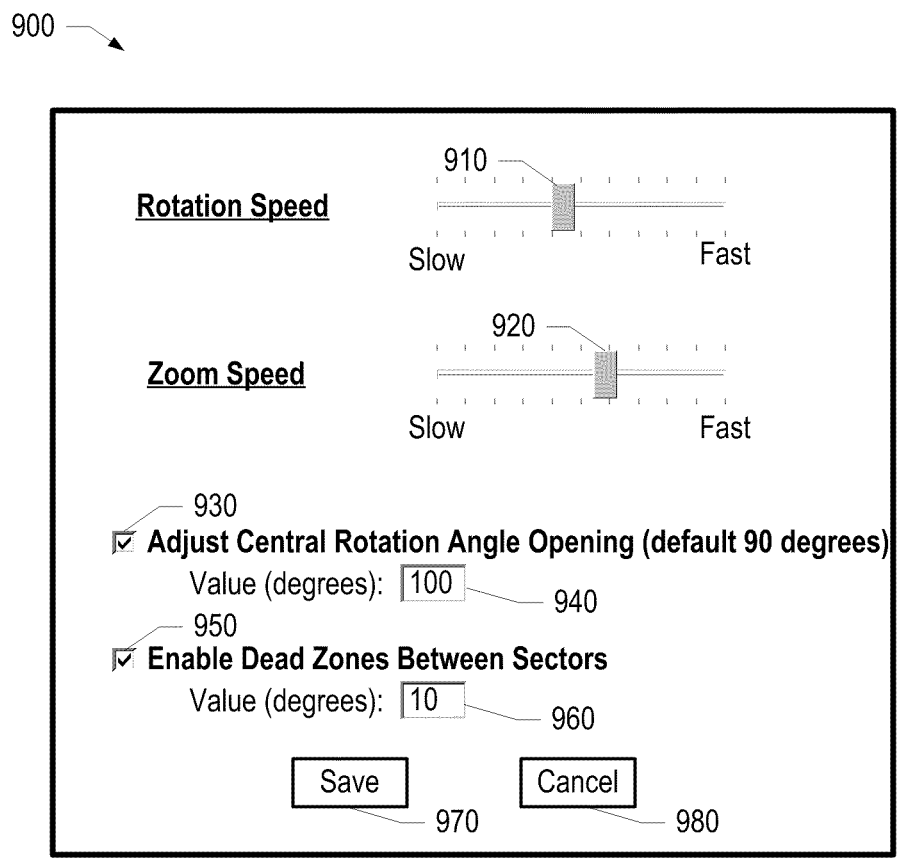
FIG. 9 is a user interface window showing user configuration settings for the invention described herein.

FIG. 9 is a user interface window showing user configuration settings for the invention described herein. Window 900 allows a user to adjust various zoom, rotate, and dead zone settings based upon the user's preferences. The user may move slide bar 910 to adjust rotation speed of an object when the user performs a rotate gesture. For example, if the user sets slide bar 910 to a "Fast" setting, the computer system rotates an object at a fast pace when the computer system detects a touch point movement entering a rotate sector.

Likewise, the user may move slide bar 920 to adjust zoom speed of an object when the user performs a zoom gesture. For example, if the user sets slide bar 920 to a "Slow" setting, the computer system zooms an object in/out at a slow pace when the computer system detects a user performing a zoom gesture, such as pinching fingers together on a touch surface.

The invention described herein allows a user to increase the size of rotate sectors by adjusting a central rotate angle opening of the rotate sectors (see FIG. 7A and corresponding text for further details). The example shown in FIG. 9 shows that the default central rotate angle opening is 90 degrees. Therefore, in the default mode, each rotate sector and each zoom sector is one-fourth of the area of a circle around a touch point. When the user wishes to change the size of the rotate sectors (thus changing the size of the zoom sectors), the user selects box 930 and enters a different central rotate angle opening in box 940. The example shown in FIG. 9 shows that the user specified the central rotate angle opening of 100 degrees. Therefore, in this example, each central rotate angle opening is 100 degrees and each central zoom angle opening is 80 degrees. Thus, each rotate sector is larger than each zoom sector.

The invention described herein also allows a user to insert "dead zones" between zoom sectors and rotate sectors (see FIG. 7B and corresponding text for further details). A dead zone is an area that, when a touch point movement enters the dead zone, the computer system ignores. For example, if a user specified dead zones and the user performed a touch point movement that enters one of the dead zones, the computer system would ignore the touch point movement and not perform a zoom command or a rotate command. When the user wishes to insert dead zones, the user selects box 950 and enters a central dead zone angle opening in box 960. The example shown in FIG. 9 shows that the user specified the dead zones to have a 10 degree angle opening. In one embodiment, the area for the dead zone is equally distributed between the zoom sectors and the rotate sectors. Therefore, a dead zone with a 10 degree central dead zone angle opening will subtract 10 degrees (5 degrees on each side) from each zoom sector and rotate sector. Considering the central rotate angle opening shown in FIG. 9, each central rotate angle opening is 90 degrees (100–10), each central rotate angle opening is 70 degrees (80–10), and each dead zone angle opening is 10 degrees, equaling a total of 360 degrees.

When the user is satisfied with the user's inputs, the user selects button 970 to save the changes. The user may select button 980 to cancel the user's changes.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
displaying an object on a touch surface;
detecting a plurality of simultaneous touch points on the torch surface in proximity to the displayed object;
determining a direction between the simultaneous touch points;
using the direction, establishing at least first and second locations of respective first and second types of sectors on the touch surface, the first type of sector being associated with a first type of command, the second type of sector being associated with a second type of command, the first location of the first type of sector being established to have a first relationship to the direction, the second location of the second type of sector being established to have a second relationship to the direction, the locations being dynamically ate d based on directions between subsequent plural simultaneous touch points;
detecting one or more touch point movements originating from one or more of the plurality of touch points;
for each of the one or more touch point movements, identifying a type of sector in which each of the one or more touch point movements enters; and
in response to determining that one of the touch point movements enters a rotate sector, forming a rotate command on the object.

2. The method of claim wherein the plurality of touch points include a first touch point and a second touch point, the method further comprising;
in response to detecting the first touch point and the second touch point, establishing a linear orientation between the first touch point and the second touch point, the linear orientation establishing the direction;
defining a zoom sector as being equilaterally aligned on the linear orientation, wherein the zoom sector includes a central zoom angle opening that defines the size of the zoom sector; and
defining the rotate sector as being equilaterally positioned perpendicular to the linear orientation, wherein the rotate sector includes a central rotate angle opening that defines the size of the rotate sector.

3. The method of claim 2 further comprising:
receiving a request to change the central rotate angle opening; and
changing the central rotate angle opening of the rotate sector, which changes the size of the rotate sector.

4. The method of claim 2 further comprising:
receiving a request to insert a dead zone between the zoom sector and the rotate sector; and
inserting the dead zone between the zoom sector and the rotate sector.

5. The method of claim 1 further comprising:
determining that one of the touch point movements entered a zoom sector and a different one of the touch point movements entered the rotate sector; and
in response to determining that one of the touch point movements entered the zoom sector and a different one of the touch point movements entered the rotate sector, performing the rotate command on the object.

6. The method of claim 1 further comprising:
in response to determining that each of the one more touch point movements enters a zoom sector, performing a zoom command on the object.

7. The method of claim 1 wherein the plurality of touch points result from a user contacting the touch surface at a plurality of contact locations.

8. An information handling system comprising:
a touch surface;
one or more processors, wherein one of the processors receive input from the touch surface;
a memory accessible by at least one of the processors;
a nonvolatile storage area accessible by at least one of the processors;
a set of instructions stored in the memory and executed by at least one of the processors in order to perform actions of:
displaying an object on the touch surface;
detecting a plurality of simultaneous touch points on the touch surface in proximity to the displayed object;
detecting one or more touch point movements originating from one or more of the plurality of touch points;
for each of the one or more touch point movements, identifying a type of sector in which each of the one or more touch point movements enters, locations of the sectors being dynamically established with respective to respective lines between simultaneous touch point pairs; and
in response to determining that one of the touch point movements enters a rotate sector, performing a rotate command in the object.

9. The information handling system of claim 8 wherein the plurality of touch points include a first touch point and a second touch point, the set of instructions further performing actions of:
in response to detecting the first touch point and the second touch point establishing a linear orientation between the lint touch point and the second touch point;
defining a zoom sector as being equilaterally at aligned on the linear orientation, wherein the zoom sector includes a central zoom angle opening that defines the size of the zoom sector, and
defining the rotate sector as being equilaterally positioned perpendicular to the linear orientation, wherein the rotate sector includes a central rotate angle opening that defines the size of the rotate sector.

10. The information handling sytem of claim 9 wherein the set of instructions further performs actions of:
receiving a request to change the central rotate angle opening; and
changing the central rotate angle opening of the rotate sector, which changes the size of the rotate sector.

11. The information handling system of claim 9 wherein the set of instructions further performs actions of:
receiving a request to insert a dead zone between the zoom sector and the rotate sector; and
inserting the dead zone between the zoom sector and the rotate sector.

12. The information handling system of claim 8 where the set of instructions further performs actions of:
determining that one of the touch point movements entered a zoom sector and a different one of the touch point movements entered the rotate sector; and
in response to determining that one of the touch point movements entered the zoom sector and a different one of the touch point movements entered the rotate sector, performing the rotate command on the object.

13. The information handling system of claim 8 wherein the set of instructions further performs actions of:
in response to determining that each of the one or more touch point movements enters a zoom sector, performing a zoom command on the object.

14. The information handling system of claim 8 wherein the plurality of touch points result from a user contacting the touch surface at a plurality of contact locations.

* * * * *